Dec. 13, 1966     E. FREEDMAN ETAL     3,291,875
METHOD FOR FORMING PLASTIC ITEMS
Original Filed Jan. 20, 1959     6 Sheets-Sheet 1
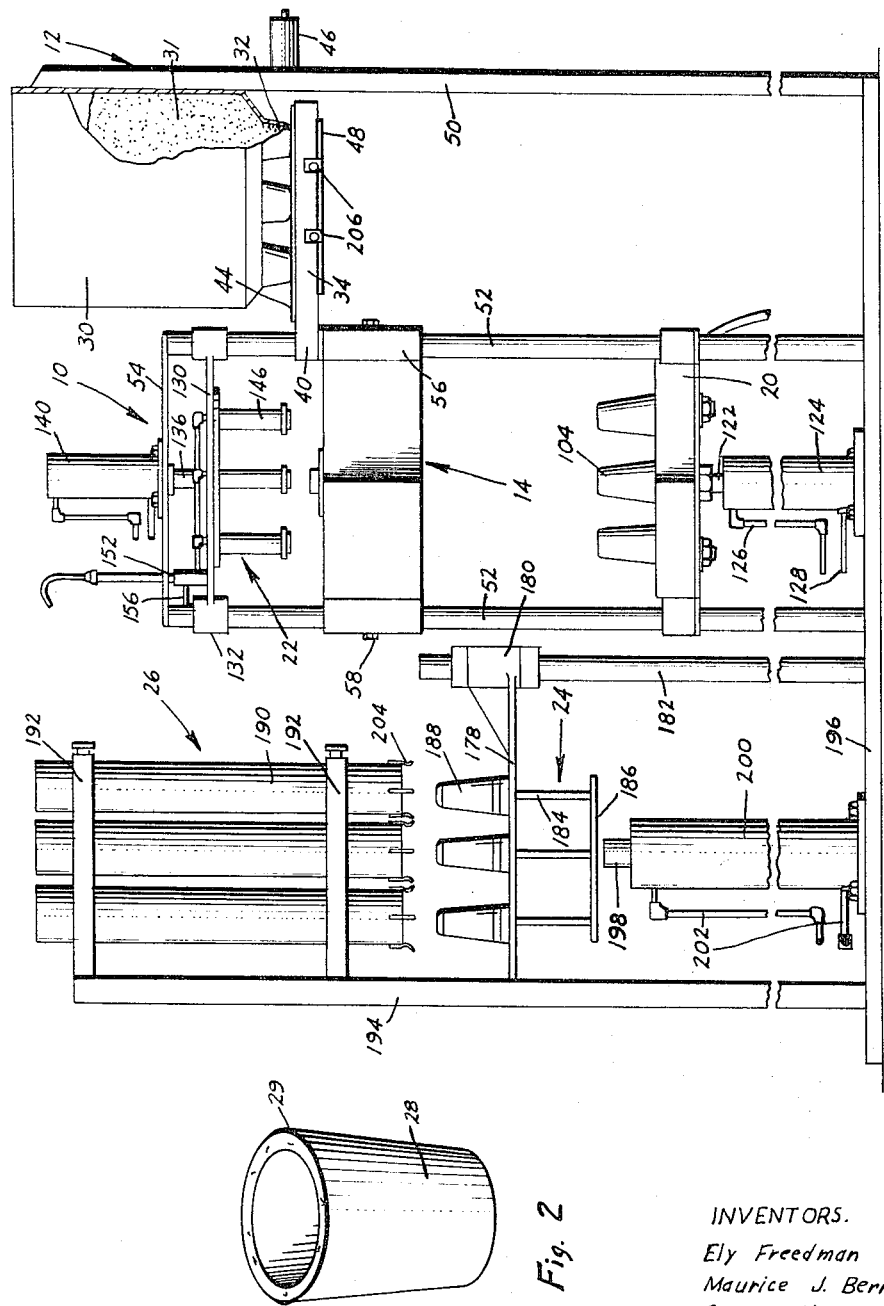
INVENTORS.
Ely Freedman
Maurice J. Bernard
Gerson Meyer
Robert Mayer
BY   Irvin V. Gleim
ATTORNEY INVENTORS.
Ely Freedman
Maurice J. Bernard
Gerson Meyer
Robert Mayer BY Irvin V. Gleim

ATTORNEY

INVENTORS.
Ely Freedman
Maurice J. Bernard
Gerson Meyer
Robert Mayer

BY Irvin V. Gleim

ATTORNEY

Dec. 13, 1966  E. FREEDMAN ETAL  3,291,875
METHOD FOR FORMING PLASTIC ITEMS
Original Filed Jan. 20, 1959  6 Sheets-Sheet 5

INVENTORS.
Ely Freedman
Maurice J. Bernard
Gerson Meyer
Robert Mayer

BY Irvin V. Gleim

ATTORNEY

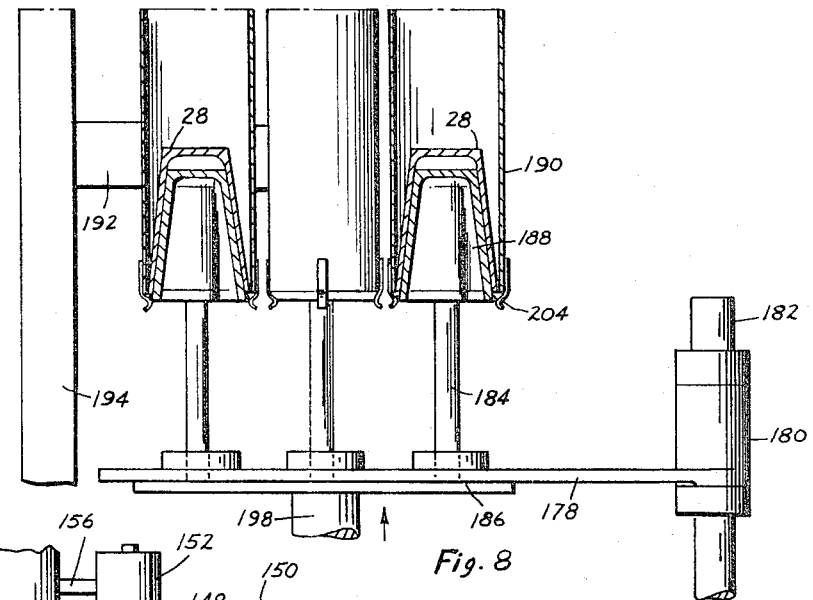
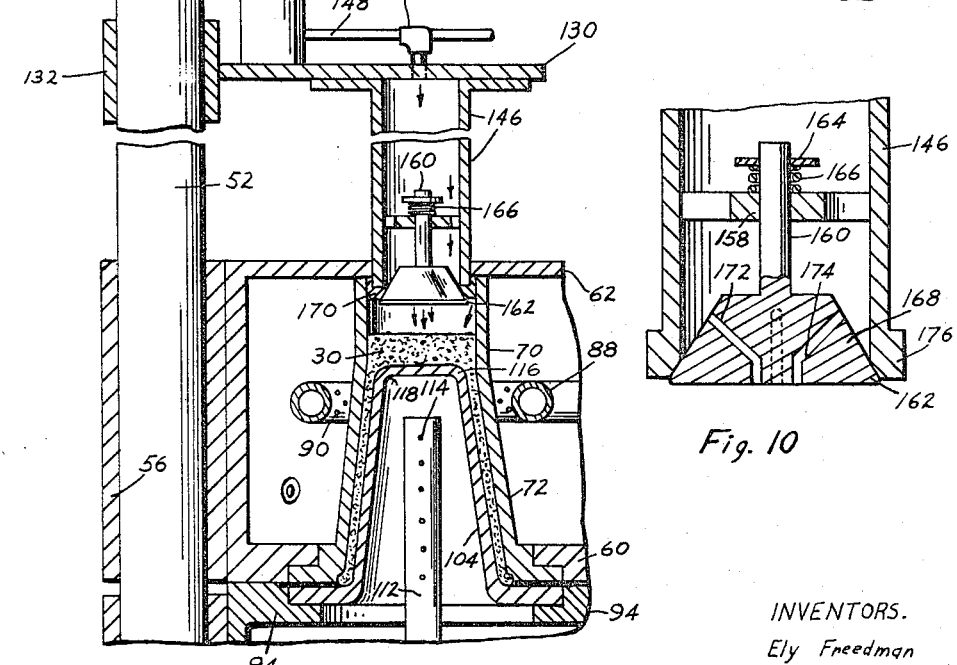

United States Patent Office 3,291,875
Patented Dec. 13, 1966

3,291,875
METHOD FOR FORMING PLASTIC ITEMS
Ely Freedman and Maurice J. Bernard, Atlanta, Ga., Gerson Meyer, Baltimore, Md., and Robert Mayer, Scarsdale, N.Y., assignors to Temp-Tainer Corporation, a corporation of Georgia
Continuation of application Ser. No. 787,945, Jan. 20, 1959, now Patent No. 3,118,176, dated Jan. 21, 1964. This application Jan. 20, 1964, Ser. No. 338,671
6 Claims. (Cl. 264—93)

This is a continuing application of application Serial No. 787,945, filed January 20, 1959, now U.S. Patent 3,118,176, issued January 21, 1964.

The present invention generally relates to a novel method for forming plastic items of expanded polystyrene and more particularly to such a method for use in forming disposable cups having an extremely low manufacturing cost and having heat insulation qualities such that the cups (or other items) may be used for heated or cooled liquids.

There currently is on the commercial market various brands of paper cups which are relatively inexpensive and which are intended to be thrown away after use. However, paper cups are very poor insulators thus requiring a special construction if the cups are intended to be used with hot liquids such as hot coffee or the like. Some measure of success has been found by providing handles for cups intended to be used with hot liquids. However, this adds to the cost of the cup and also provides a very insecure grip for the cup. Therefore, it is the primary object of the present invention as it relates to a cup to provide a cup of an expanded plastic material having a weight less than the weight of a comparative size paper cup and having a manufacturing cost equal to or less than a comparative paper cup and which also has insulation qualities due to the cellular construction thereof which enables hot liquid to be consumed from the cup with the cup being gripped in the normal manner and without any discomfort being felt by the person holding the cup after which the cup may be thrown away similar to the manner in which a paper cup is thrown away.

The material from which the plastic cup is manufactured is an expanded styrene expanded from 20 to 50 times its initial volume and constituted by a plurality of independent closed cells which are not communicated with each other which provides the insulation qualities and also provides a liquid proof construction when the expanded styrene is formed into a finished cup by the machine for so forming the cup. The machine includes generally a male die and a female die spaced therefrom with the space between the dies receiving the expanded styrene material and generally shaping the same as a cup together with a plunger having an air nozzle incorporated therein for blowing the expanded styrene into the area between the dies thereby maintaining the expanded condition of the expanded styrene until it is formed into the shape of a cup (the plunger makes the bottom of the cup) after which final pressure and heat is applied to the expanded styrene for forming an extremely light cup having a cellular construction with the cells being independent from each other thereby providing a high degree of insulation and also providing liquid-proof qualities to the cup.

The machine also employs an air injection apparatus for injecting the expanded styrene into the area between the male and female molds or dies, means for setting and curing the cup and then cooling the same, means for ejecting the cup from the mold and delivering the same to a storage area.

A further object of the present invention is to provide a method in accordance with the preceding which is relatively simple, adapted for automatic operation, easy to use, efficient in operation and relatively inexpensive.

A still further object is to provide a method for forming plastic items of expanded plastic material which method contemplates inter alia, the steps of placing a predetermined quantity of mold material is an open end of a mold cavity interconnected with a mold chamber, moving a plunger into said end of said cavity to close said cavity and move into position to form part of said mold chamber, and directing fluid pressure through said plunger into said cavity to force said mold material into said chamber during the increment of movement of said plunger in closing said cavity and forming part of said mold chamber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevation of the machine showing the relationship of the component parts thereof together with the mechanism for supplying the raw material and the mechanism for removing and storing the finished product;

FIGURE 2 is a perspective view of one of the finished cups;

FIGURE 8 is a detailed sectional view of the finished cup storage mechanism;

FIGURE 9 is an enlarged detail sectional view illustrating the orientation of the structure when compressed air is used for blowing the expanded material into the area between the molds; and FIGURE 10 is a detailed sectional view, on an enlarged scale, of one of the plungers and the air injection apparatus incorporated therewith.

Figure 3:
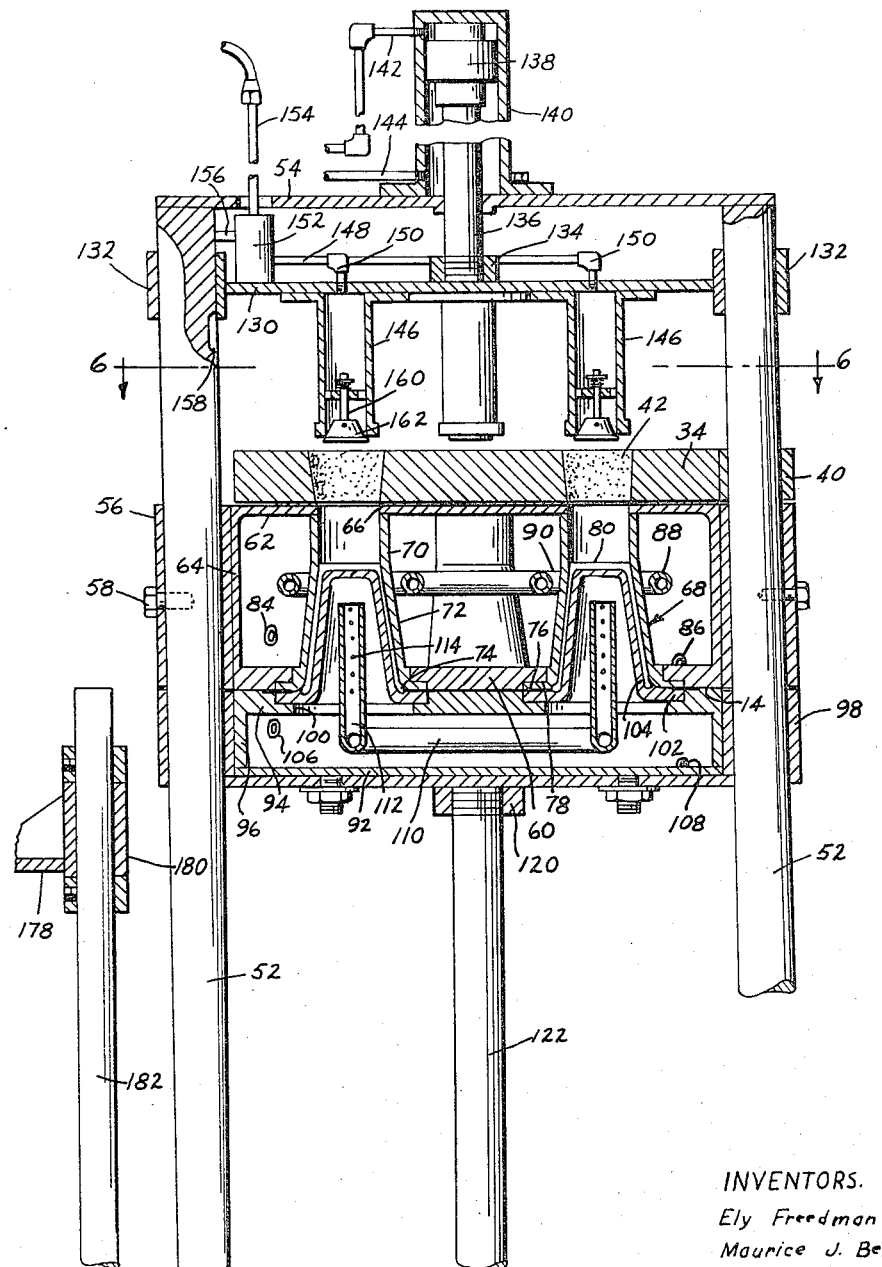
FIGURE 3 is a vertical sectional view of the machine illustrating the first step in which the raw material is being supplied into the female die or mold after the male mold has been raised into position.

Referring now to the drawing, numeral 10 generally designates the plastic cup forming machine which includes a supply apparatus generally designated by numeral 12, a stationary central mold section 14, a lower movable mold section generally designated by the numeral 20 and an upper movable plunger section generally designated by the numeral 22, means for removing the finished cup designated generally by the numeral 24 and means for storing the completed cups generally designated by numeral 26 with the finished cups being designated by numeral 28 and which has a peripheral bead or rim 29 at the free edge thereof.

Supply mechanism 12 broadly includes a hopper 30 having a quantity of expanded styrene 31 therein and which has a plurality of discharge spouts or nozzles 32 for alignment with a supply plate 34 having an annular ring 40 on one edge thereof and a plurality of measuring openings 42 for alignment with discharge nozzles 32 for receiving a quantity of the material and delivering it to the central mold section 14. A movable closure plate 44 is provided for spouts 32 and may be solenoid actuated by solenoid 46 whereby the swinging supply 34, when in alignment with discharge nozzle 32 will energize solenoid 46 by engagement with a suitable microswitch or the like thereby moving plate 44 so that apertures therein will become aligned with discharge nozzle 32 for discharging material 31 into openings 42. A lower plate 48 is provided for closing the lower ends of openings 42 and this plate will remain closed until swing plate 34 is moved into overlying relation to central section 14 whereupon it will be opened and will discharge material 31 from openings 42 into the central section 14 in a manner to be described hereinafter. Bin 12 is supported by a suitable supporting member 50 alongside of the machine 10.

Machine 10 includes a pair of upstanding rods or frame members 52 rigidly interconnected by a transverse plate 54 at the upper ends thereof and also rigidly interconnected by a central section 14 which is provided with a pair of sleeves 56 encircling frames 52 and held rigid thereon by bolts or other suitable fastening means 58.

Referring now specifically to FIGURE 3, central section 14 includes a lower plate 60 and an upper plate 62 interconnected by a side plate 64 which defines a hollow interior. Upper plate 62 is provided with a plurality of openings 66 and depending from each opening 66 is a hollow member generally designated by the numeral 68 and including an upper cylindrical portion 70 and a lower tapered portion 72 which tapers outwardly and forms a female mold or die which has at the lower edge thereof a peripheral recess 74 for forming a bead and an outwardly extending flange 76 received in a recessed or countersunk opening 78 in lower plate 60. The line of juncture between the cylinder section 70 and the tapered section 72 is designated by the numeral 80. Peripheral wall 64 is provided with a steam inlet pipe opening 84 and also a water outlet pipe opening 86. Encircling each of the female mold members 68 is a water spray pipe 88 having a plurality of apertures 90 therein which will discharge water onto the outer surface of female member 68 for cooling the same. A water supply line is attached to the conduit 88 in any suitable manner.

The lower movable section 20 includes a lower plate 92, an upper plate 94 and a peripheral wall 96 having sleeves 98 attached thereto slidably engaged with the upright frame members 52. The lower section is also hollow and the upper plate 94 is provided with a plurality of countersunk apertures 100 receiving flanges 102 on the lower ends of frusto-conical male members 104 which are received within the tapered portion 72 of the female mold members 68. The wall 96 is provided with a steam inlet pipe 106 and also a drain pipe 108 and a water supply conduit 110 having upstanding branches 112 extending interiorly of each frusto-conical member 104 with the upwardly extending member 112 having a plurality of apertures 114 for spraying water against the inner surface of the frusto-conical member 104 for purposes of cooling the same. The top wall 116, FIGURE 9, of the frusto-conical member 104 is provided with a series of circumferentially spaced apertures 118 therein which are extremely small and which are for the purposes of permitting air passage through top wall 116 for breaking the vacuum that would be caused by downward movement of the frusto-conical member 104 away from the cup after it had been completed and also for permitting air to pass therethrough for assuring that the cup will not recede downwardly with the male mold member or die 104.

Lower plate 92 is provided with an adapter 120 receiving the upper end of a piston rod 122 extending into a cylinder 124, FIGURE 1, which is of the double acting type and provided with air lines 126 and 128 for admitting air into the desired end of cylinder 124 for urging the lower section upwardly or downwardly as may be desired.

The upper section 22 includes a plate 130, FIGURE 3, having a pair of sleeves 132 thereon slidable on the upstanding frame members 52 with the center of plate 130 also having a threaded adapter 134 for threadedly engaging the lower end of a piston rod 136 which has a piston 138 on the other end thereof slidable within a cylinder 140 mounted rigidly on the transverse bar 54 and which has an air conduit 142 leading into the upper end thereof and an air conduit 144 leading into the lower end thereof for providing a double acting piston and cylinder arrangement for raising and lowering the plate 130.

Figure 4:
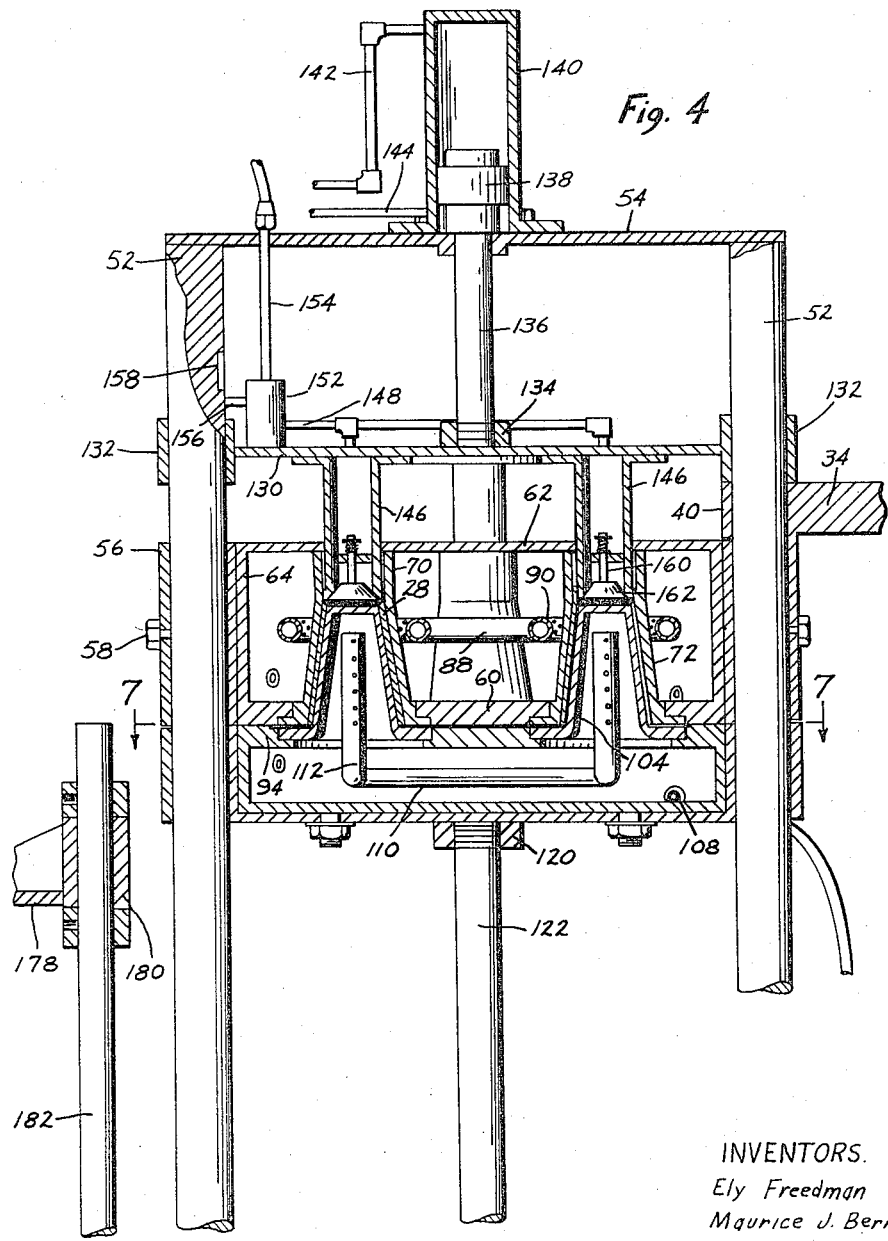
FIGURE 4 is a sectional view similar to FIGURE 3 illustrating the relationship of the component parts of the machine in the final stage of forming the cup.
Figure 5:
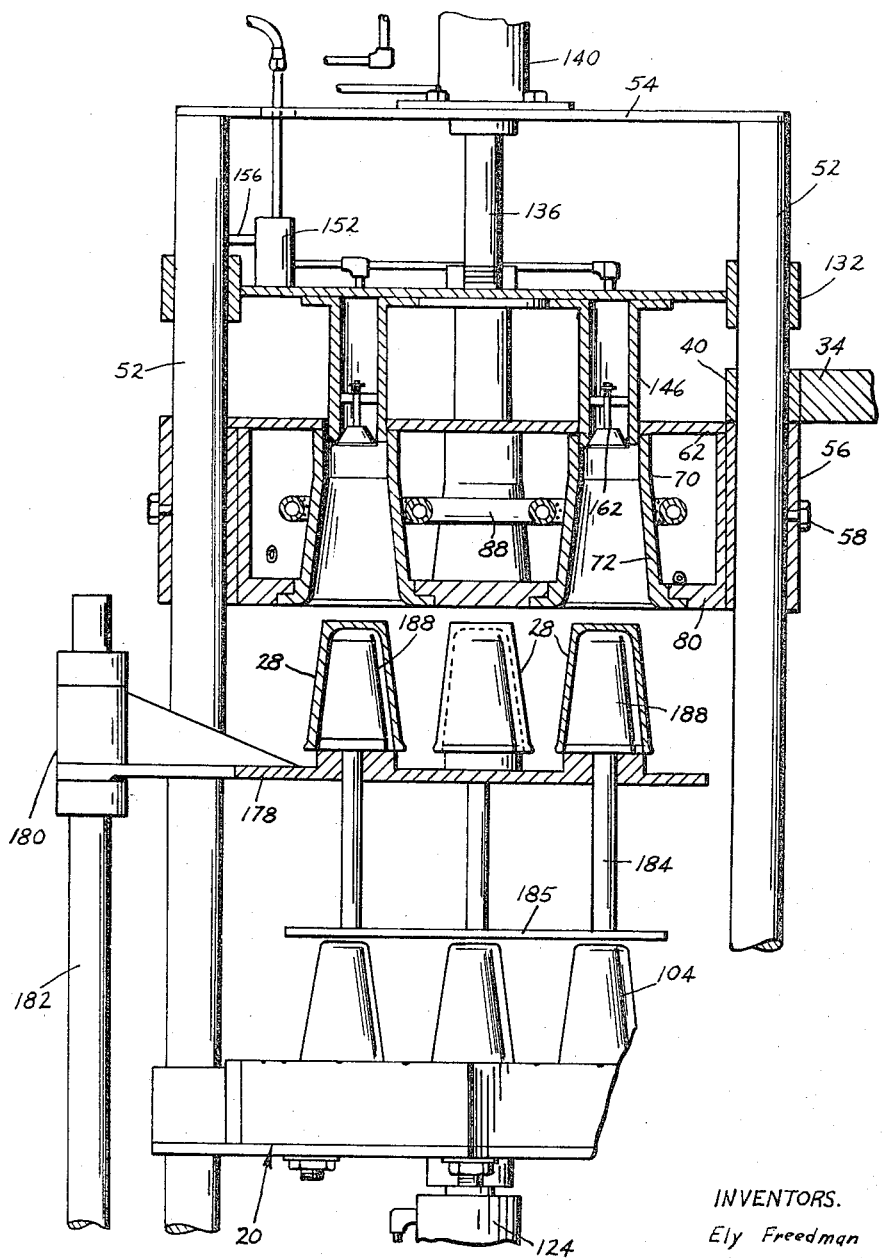
FIGURE 5 is a sectional view similar to FIGURE 3 illustrating the finished cup being removed from the female mold.
Figure 6:
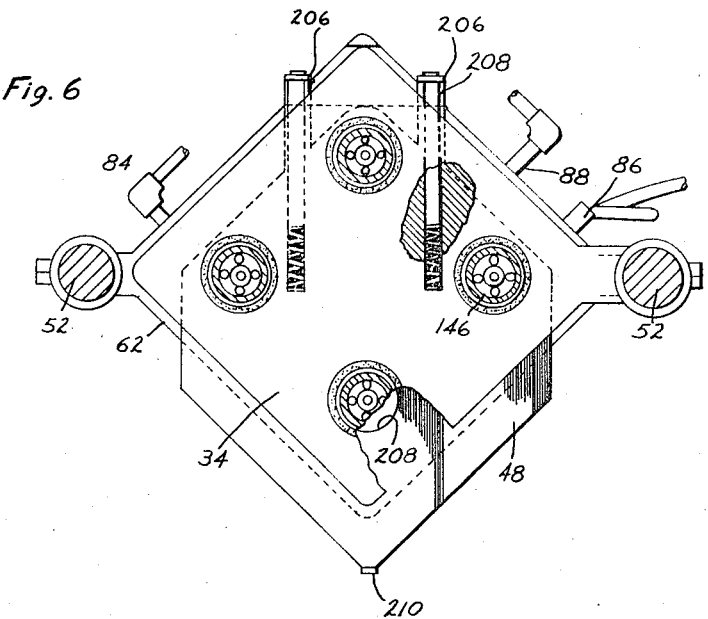
FIGURE 6 is a transverse, sectional view taken substantially upon a plane passing along section line 6—6 of FIGURE 3 illustrating the construction of the filler or supply plate.
Figure 7:
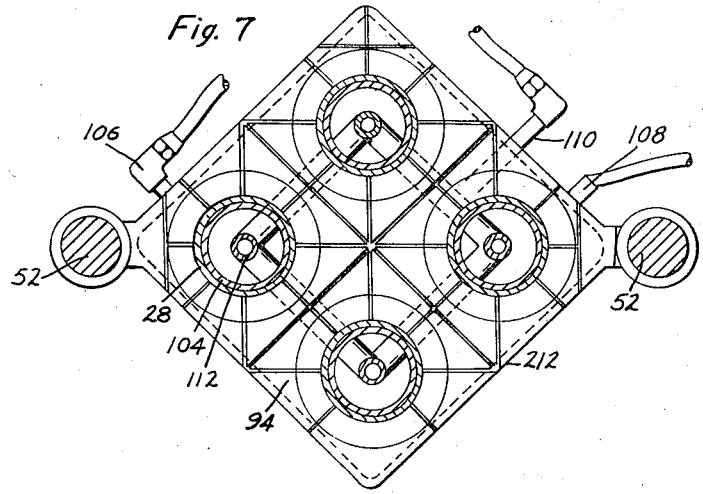
FIGURE 7 is a transverse, sectional view taken substantially upon a plane passing along section line 7—7 of FIGURE 4 illustrating the details of construction of the molds and the relationship therebetween.

Extending downwardly from plate 130 is a plurality of hollow cylindrical plungers 146 each of which is communicated with an air supply line 148 by virtue of a fitting 150 with the air supply line 148 extending from a control valve 152 connected with an air line 154 and having a plunger 156 engageable with a cam recess or projection 158, FIGURE 4, mounted on the vertical frame member 52 for controlling inlet of air into the respective cylindrical plungers 146.

FIGURE 10 illustrates the detail of the lower end of each plunger 146 which includes a supporting spider 158 slidably supporting the shank 160 of a valve member 162. The shank 160 extends through spider 158 and is provided with a removable washer or annular member 164 on the upper end thereof with a compression spring 166 disposed between spider 158 and washer 164 thus normally urging valve 162 inwardly into the cylindrical plunger 146.

The lower end of shank 160 is integral with valve 162 which is generally a frustrum of a cone and provided with a downwardly and outwardly tapering peripheral surface 168 which engages a similar inclined valve seat 170. Valve 162 is provided with four angularly extending passageways 172 which terminate in discharge apertures 174 about the center of the bottom surface of valve member 162 which projects below the bottom edge of plunger 146 slightly and which projecting portion has vertical edges or edges parallel to the longitudinal axis of the cylindrical plunger 146.

When air is admitted into the interior of plunger 146, the air pressure will force valve 162 off of the valve 170 slightly so that air will discharge downwardly and outwardly between valve 162 and the valve 170 and at the same time discharge through passageways 172. As soon as the air pressure stops, spring 166 will return the valve 162 to a seated position but valve 162 will still project downwardly beyond the lower edge of cylindrical plunger 146 which also has a peripheral shoulder 176 at the lower end thereof for telescopic engagement with the upper end of cylindrical portion 70 of the female die or mold member 68 for a purpose described hereinafter.

The mechanism 24 for removing the finished cups includes a swinging plate 178 having a sleeve 180 mounted thereon and rotatable on an upright support 182. Slidably mounted in the plate 178 is a plurality of shanks 184 having their lower ends interconnected by an operating bar 186 and having on their upper ends a generally frusto-conical member 188 similar in shape and size to the frusto-conical members 104.

When the movable section 20 is lowered, plate 178 may be rotated about the axis of the upright 182 into overlying relation to the frusto-conical members 104 wherein the frusto-conical members 104 may be lowered and left down while 178 swings into place so that the cups will be deposited on the frusto-conical members 188 in a manner to be described hereinafter so that the same may be swung outwardly into a position underlying the storage mechanism 26.

Storage mechanism 26 includes a plurality of vertically disposed tubular members 190 supported by brackets 192 on an upright 194 having a base 196 carrying a piston 198 and cylinder 200 with air lines 202 connected thereto whereby piston 198 may be expanded for moving the frusto-conical members 188 upwardly into the open lower ends of tubular members 190. The lower end of the tubular members 190 are each provided with clips 204 for gripping engagement with lips 29 of the finished cups 28 for retaining the cups in nested inverted stacked relation in tubular members 190. The upper end of tubular members 190 may be opened so that a quantity of the stock of inverted cups may be removed when they proceed above the tubular members 190 or all of the cups may be removed by manually spreading the spring clips 204 apart.

The movable plate 48 is provided with a pair of upstanding lugs 206 which are attached to spring-urged plungers 208 carried by supply plate 34. As supply plate 34 moves to a position overlying the stationary central section 14, the corner of sliding plate 48 engages a stop member causing sliding movement of plate 48 so that apertures 208 therein may become aligned with apertures 42 in plate 24 for supplying the material into the cylindrical section of the female mold or die member. When plate 34 is swung away from the stop member, the spring urged plungers 208 return plate 48 to an original position with there being a stop lug 210 for limiting sliding movement of plate 48.

The top surface of upper plate 94 of the bottom movable section 20 is provided with grooves 212 for bleeding of air from between the male and female die or mold for assuring proper filling of this area and for assuring proper completion of the cup. The elements 50, 52, 182, 194 and 196 form the frame struction of the machine 10.

In operational procedure, lower section 20 and upper section 22 are spaced remotely from the central stationary section 14. Plate 34 is swung inwardly after the apertures therein have been filled and the material will be deposited gravitationally into the cylindrical upper end 70 of the female mold 68. This is done after the male molds or die members 104 are elevated to close the lower end of the central section. Plate 34 is then swung to an out-of-the-way position for refill of the apertures therein and the upper section is lowered so that the lower ends of plungers 146 are just inside or below the upper end of the cylindrical section 70 with this condition being illustrated in FIGURE 9. As plate 130 is lowered to this position, plunger 156 will drop into the cam groove thus admitting air into plunger 146. Air pressure in plunger 146 will engage the upper surface of the valve 162 thus forcing valve 162 off of the seat so that air passes between valve 162 and seat 170 and also passes downwardly through the passageways 172. This air will flow the expanded styrene 30 into the area between the male die member 104 and the tapered section 72 and will force the air out through grooves 212. As plate 130 is lowered further, the air will be cut off by cam operated valve 152 and the plunger will be lowered to its final position which is illustrated in FIGURE 4. In this condition, the lower end of the plunger forms the bottom of the cup with the face of valve member 162 forming the recess in the bottom due to the projection of valve member 162 slightly beyond the bottom end of plunger 146. Steam is then turned on for heating the female die member and the male die member for a predetermined length of time with the pressure of the downward force of plate 130 and the increase in temperature caused by the steam causing a final cohesion between the cells of the expanded styrene and causing a substantially glazed external and internal finish on the final cup product. After the steam has been applied for a predetermined time increment which is only a matter of seconds, the steam is shut off and water is sprayed into the interior of the molds thus cooling the same. Drain pipes are provided for the water and the steam and these are valve controlled as is the inlet for the steam and water. For aiding in water evacuation or discharge from the molds, compressed air may be admitted into the same. When compressed air is admitted into the lower mold and the lower mold is initially lowered, some of the compressed air will pass through the openings 118 for breaking the vacuum in the internal surface of the cup and the external surface of the male mold member 104 and will retain the cup in the female mold member 68. After the male mold member 104 has been lowered, plate 178 is swung inwardly so that male members 188 are able to receive the cups. Plate 130 is then raised after plate 178 is swung into position whereupon entrance of air back into the plunger caused by the cam valve 152 passing over the cam again will cause the air to blow the cup downwardly out of the stationary female mold directly onto the male members 188 so that the cups will be simultaneously moved downwardly then swung over and raised upwardly into the tubular members 190. As male members 188 proceed into the tubular members 190, the clips 204 clip over the beads of the cup whereupon the male members 188 may recede downwardly and leave cups 28 in the tubular members. The last blast of air into the female mold members 68 also cleans the female mold member for subsequent operation.

While the device and method have been described as a manual operation and the device has been illustrated with four molds for each unit, it is pointed out that any number of cups may be provided with a single operation and by providing various automatic controls, all of the operational procedures may be sequentially and automatically performed. In practical operation, it has been found that the entire cycle of forming each group of cups lies between 30 and 40 seconds. However, with proper automation and automatic controls, the time could undoubtedly be reduced. Also, the cup may be provided with downwardly extending flutes on the upper outer surface thereof for purposes of aiding in the breaking of the vacuum between a plurality of cups when they are in nested relation. Various means may be provided for this purpose on the cup.

The foregoing is considered as illustrative only of the principles of the invention. Further, since numerous modifications and changes will readily occur to those skilled in the art, it is not desired to limit the invention to the exact operation and method shown and described, and accordingly, all suitable modifications and equivalents may be resorted to, falling within the scope of the invention as claimed.

What is claimed is:

1. A method for making an article from mold material and comprising the steps of placing a predetermined quantity of mold material in an open end of a mold cavity interconnected with a mold chamber, moving a plunger into said end of said cavity to first close said cavity and continuing to move to another position to form part of said mold chamber, and directing fluid pressure through said plunger into said cavity to force said mold material into said chamber after movement of said plunger closes said cavity and prior to forming part of said mold chamber.

2. A method for making a cup-shaped article from expanded plastic material and comprising the steps of placing a predetermined quantity of expanded plastic material in an open end of a mold cavity interconnected with a cup-shaped mold chamber, moving a plunger into said end of said cavity to first close said cavity and continuing to move to another position to form part of said mold chamber, and directing fluid pressure through said plunger into said cavity to force said plastic material into said chamber after movement of said plunger closes said cavity and prior to forming part of said mold chamber.

3. A method as set forth in claim 2 and including the terminal steps of heating said mold chamber to bond said plastic material together and thereafter cooling said mold chamber.

4. A method for making a cup-shaped article from expanded plastic material and comprising the steps of moving a male mold member into one end of a mold cavity to close said one end thereof, said male mold member cooperating with said cavity to define part of a cup-shaped mold chamber, moving a measuring compartment adjacent another open end of said cavity to dispose a predetermined quantity of plastic material in said other open end, said other open end being interconnected to said mold chamber, moving a plunger into said other open end of said cavity to close said cavity and move into position to form part of said mold chamber, and directing fluid pressure through said plunger into said cavity to force said plastic material into said chamber during the increment of movement of said plunger in closing said cavity and forming part of said mold chamber.

5. A method as set forth in claim 4 and including the terminal steps of heating said mold chamber to bond said plastic material together and thereafter cooling said mold chamber.

6. A method as set forth in claim 5 and including the additional terminal steps of moving said male mold member away from said cavity, moving an article removing device adjacent said one end of said cavity to receive said article, moving said plunger away from said cavity, and directing fluid pressure through said plunger against said article to cause said article to be forced from said cavity against said article removing device during the increment of movement of said plunger from forming part of said mold chamber and opening said other end of said cavity.

References Cited by the Examiner

UNITED STATES PATENTS

| | | | |
|---|---|---|---|
| 1,911,011 | 5/1933 | Brotz | 264—334 X |
| 1,916,798 | 7/1933 | Hottel | 264—334 X |
| 2,512,871 | 5/1950 | Ostermann | 22—10 |
| 2,951,260 | 9/1960 | Harrison et al. | 18—5 |
| 3,103,698 | 9/1963 | Wollett. | |
| 3,125,780 | 3/1964 | Harrison et al. | 18—5 |

ROBERT F. WHITE, *Primary Examiner.*

ALEXANDER H. BRODMERKEL, *Examiner.*

M. R. DOWLING, *Assistant Examiner.*